Nov. 22, 1966   J. WOLLENHAUPT   3,286,595
MACHINE TOOL

Filed Sept. 21, 1965   7 Sheets-Sheet 2

INVENTOR
JAKOB WOLLENHAUPT
BY
Michael J. Striker
his ATTORNEY

INVENTOR
JAKOB WOLLENHAUPT
BY
Michael J. Striker
his ATTORNEY

Nov. 22, 1966 J. WOLLENHAUPT 3,286,595
MACHINE TOOL
Filed Sept. 21, 1965 7 Sheets-Sheet 5
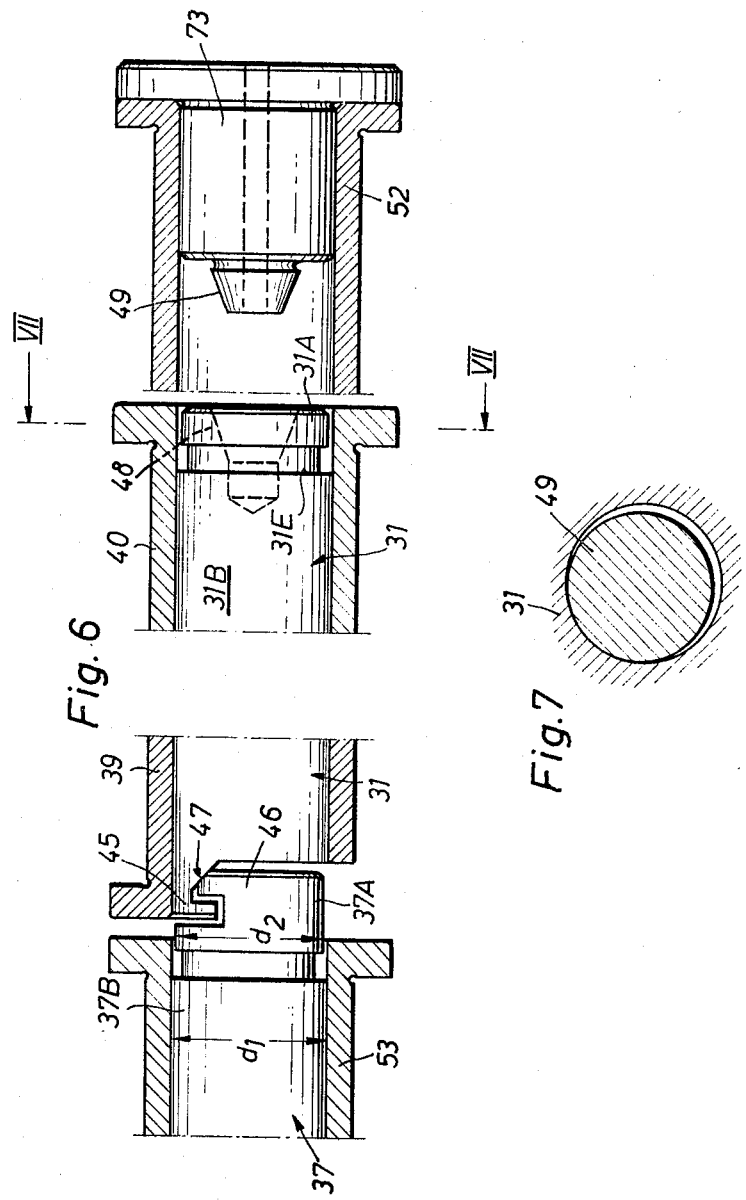
INVENTOR
JAKOB WOLLENHAUPT
BY
Michael J. Straker
his ATTORNEY Nov. 22, 1966       J. WOLLENHAUPT       3,286,595
                    MACHINE TOOL
Filed Sept. 21, 1965                    7 Sheets-Sheet 6
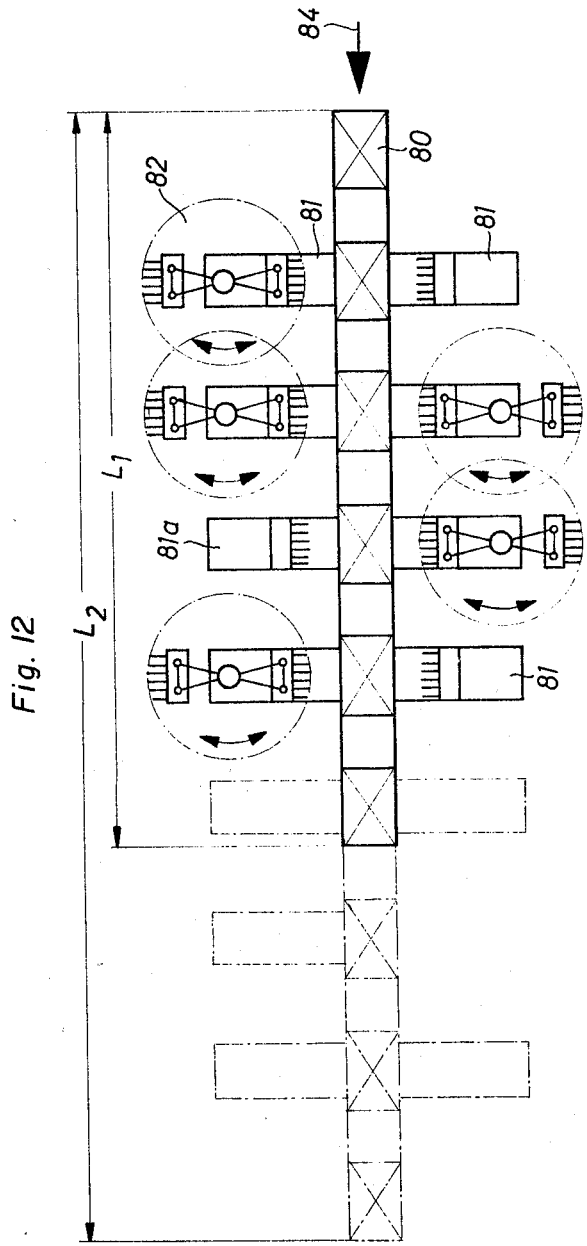
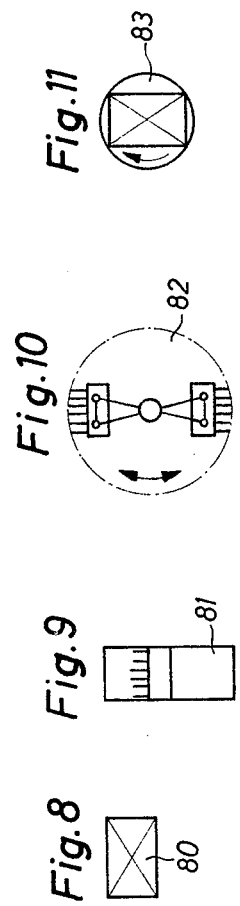
INVENTOR
JAKOB WOLLENHAUPT
BY
Michael J. Striker
his ATTORNEY Nov. 22, 1966    J. WOLLENHAUPT    3,286,595
MACHINE TOOL Filed Sept. 21, 1965    7 Sheets-Sheet 7

INVENTOR
JAKOB WOLLENHAUPT
BY
Michael J. Striker
his ATTORNEY

United States Patent Office 3,286,595
Patented Nov. 22, 1966

3,286,595
MACHINE TOOL
Jakob Wollenhaupt, Bergisch-Gladbacher Strasse 635,
Cologne-Holweide, Germany
Filed Sept. 21, 1965, Ser. No. 489,031
Claims priority, application Germany, Sept. 26, 1964,
W 37,611
32 Claims. (Cl. 90—11)

The present invention relates to machine tools in general, and more particularly to an improved automatic multiple spindle machine. Still more particularly, the invention relates to improvements in automatic multiple spindle machines of the type known as horizontal boring, tapping, drilling, reaming, turning or milling machines.

It is already known to provide the tool holder of an automatic boring or like machine with a plurality of spindles each of which may receive and drive a separate tool. The time required to complete a series of operations on a rather bulky workpiece is reduced proportionally with an increase in the number of tools which can treat the workpiece in a simultaneous operation. For example, boring machines are often provided with tool holders which can carry in excess of one hundred spindles.

It is also known to assemble a plurality of conventional multiple spindle machines into a production line which is capable of subjecting a workpiece to a large number of different treatments. Thus, a complicated workpiece (such as the cylinder head or the transmission case of an internal combustion engine) may be treated during travel along a production line by being subjected to the action of hundreds of boring, tapping, thread cutting, milling and/or turning instrumentalities. As a rule, the workpiece is mounted in an automatic transfer machine which advances from station to station and causes the workpiece to assume at each such station a requisite position so as to make sure that the particular operation is carried out with utmost precision. In many instances, the working stations are disposed in a row and the manner in which the work advances is such that, in response to each intermittent operation of the transfer machine, each working station receives a fresh workpiece and a finished workpiece can be removed from the production line while the transfer machine simultaneously receives a raw blank for delivery to the first working station. The length of intervals between intermittent operations of the transfer machine depends on the operation of that machine tool which requires the longest period of time to complete a particular treatment. Such production lines can turn out large quantities of products as long as they operate at full capacity. However, they also possess a very serious drawback, namely, that it requires much time (often days and even weeks or months) to convert them for treatment of a different type of work. As a rule, the programming of such machines is rather inflexible, i.e., the distance between the spindles on a tool holder, the diameters of tools, rotational speeds of the spindles, the rate of feed and similar characteristics are difficult to change and involve exceptionally large expenditures in time and material so that, during conversion to another type of operation, the production line remains idle for long periods of time. Such conversion invariably necessitates the manufacture of new tool holders for a plurality of spindles, new patterns, new tools and substantial assembling work.

Known attempts to reduce the rigidity of such conventional automatic machines can be classified in two main groups, namely, (a) the production of tool holders wherein the distance between the spindles, the number of spindles and certain other characteristics may be changed to a certain extent, and (b) the production of tool holders with automatic exchange of tools in accordance with information stored on perforated tape or another suitable information carrier. A serious drawback of the solution (a) is that the conversion of tool holders for a different operation still involves much time and that such conversion must be carried out while the tool holder is detached from the remainder of the machine so that the machine is then idle. The solution (b) suffers from the drawback that the machine is not sufficiently versatile because the number of spindles on a tool holder is limited and also because the programming system which controls automatic exchange of tools is very complicated, expensive and prone to malfunction. Furthermore, the workpiece must change its position at frequent intervals which involves considerable losses in output and requires bulky and precision-finished work supporting tables.

Accordingly, it is an important object of the present invention to provide an automatic multiple spindle machine, preferably of the type wherein a tool holder must travel in a substantially horizontal path in order to move toward and away from the working station, and to construct the machine in such a way that it can subject bulky, complicated and hard-to-handle workpieces to a practically unlimited number of treatments without necessitating any adjustment in the position of tools in a tool holder and without necessitating the provision of automatic tool exchanging devices.

Another object of the invention is to provide an automatic multiple spindle machine whose output at least equals the output of conventional multiple spindle machines and which can be converted for a different operation within a matter of seconds so that there is practically no loss in time if the same side of a workpiece must be subjected to two or more consecutive treatments each of which involves operation with a group of differently positioned, dimensioned and/or numbered tools. By way of example, the improved automatic machine can subject a certain side of a workpiece to the action of a large number of rough-boring tools in a first step and immediately thereafter (i.e., within a matter of only a few seconds) to the action of a large number of tapping tools which penetrate into bores formed by the rough-boring tools.

A further object of the present invention is to provide an automatic machine of the above characteristics which can subject a certain side or portion of a workpiece to different multiple-spindle treatments while the position of the workpiece at the working station remains unchanged, and which is equally capable of subjecting different sides of a workpiece or a series of rapidly advancing workpieces to a number of different treatments at such a rate that the intervals between consecutive treatments can be measured in seconds.

An additional object of the invention is to provide a novel and improved production line which comprises two or more automatic machines of the above outlined characteristics or one or more such automatic machines in combination with one or more conventional machine tools.

Still another object of the invention is to provide a novel operative connection between a tool slide and a multiple-spindle tool holder for use in an automatic machine of the above outlined characteristics.

A concomitant object of the invention is to provide a novel device which can deliver, remove and transfer multiple spindle tool holders in an automatic machine of the above outlined characteristics.

A further object of the invention is to provide a horizontal multiple spindle boring, tapping, thread cutting, drilling, reaming, turning or milling machine which embodies the just outlined device and which can be converted for treatment of different types of workpieces or for subjecting a given workpiece to a series of different treatments within such short intervals of time that the conversion is completed within a period of time which is often shorter than the time required to transfer a workpiece between a pair of closely adjacent working stations.

Another object of the invention is to provide an automatic multiple spindle machine wherein the mounting of all or nearly all relatively movable parts which control the positioning and retention of a tool holder in requisite position is such that any foreign matter which might interfere with proper positioning is automatically moved out of the way or destroyed to insure that the tool holder which is in actual case use is positioned with utmost accuracy to be capable of performing its operation with maximum precision.

Briefly stated, one feature of my present invention resides in the provision of a machine tool, hereinafter called automatic machine or machine, such as a multiple-spindle horizontal boring machine, which comprises a frame, elongated guide means provided on the frame, a slide reciprocably mounted on the guide means, a first tool holder detachably connected with the slide, at least one spare tool holder, and interchanging means for replacing the first tool holder with a spare tool holder. The interchanging means comprises first displacing means operative to move the first tool holder and a spare tool holder in directions substantially at right angles toward and away from the guide means, and second displacing means for turning the tool holders subsequent to movement away from the guide means and through such an angle that the spare tool holder assumes the position previously occupied by the first tool holder and is ready to be connected with the slide on movement toward the guide means.

The guide means may consist of horizontal rails and the slide may be reciprocated along such rails toward and away from a retracted position in which the tools mounted on the tool holder that is connected with the slide are spaced from the work. The first displacing means then constitutes a lifting device which is operative to move the tool holders vertically between upper and lower positions in retracted position of the slide, and the second displacing means may comprise a turning device which turns the tool holders in their upper positions through such an angle that the spare tool holder is automatically connected with the slide on subsequent movement to its lower position.

The machine preferably also comprises a magazine which is constructed and assembled in such a way that it may receive from the interchanging means that first tool holder which has been disconnected from the slide and that it can deliver to the interchanging means at least one additional spare tool holder whereby the interval of time needed by the spare tool holder to perform on the workpiece a single operation or a series of operations suffices to allow for automatic or semiautomatic replacement of the first tool holder with an additional spare tool holder.

The novel features which are considered as characteristic of the invention are set forth in particular in the appended claim. The improved automatic machine itself, however, both as to its construction and its mode of operation, together with additional features and advantages thereof, will be best understood upon perusal of the following detailed description of certain specific embodiments with reference to the accompanying drawings, in which:

FIG. 6 is an enlarged fragmentary transverse horizontal section as seen in the direction of arrows from the line VI—VI of FIG. 3 and illustrates the construction of the locking unit;

FIG. 7 is a vertical section as seen in the direction of arrows from the line VII—VII of FIG. 6 but with the bolt of the locking unit shifted to locking position;

FIG. 8 is a symbolic and greatly simplified representation of a simple work holder;

FIG. 9 illustrates symbolically a horizontal multiple spindle boring machine without an inverting device;

FIG. 10 illustrates a symbol for an inverting or interchanging device;

FIG. 11 shows a symbol for a rotary work holder;

FIG. 12 is a diagrammatic top plan view of a production line which is assembled of eight automatic machines, the symbols used in FIG. 12 being those which are shown in FIGS. 8 to 11;

Figure 13:
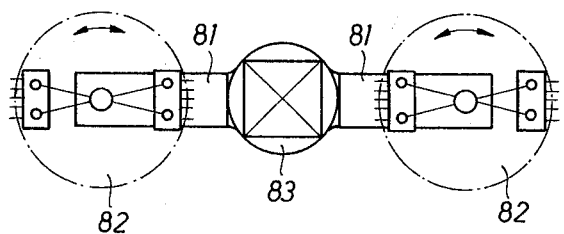
Figure 14:
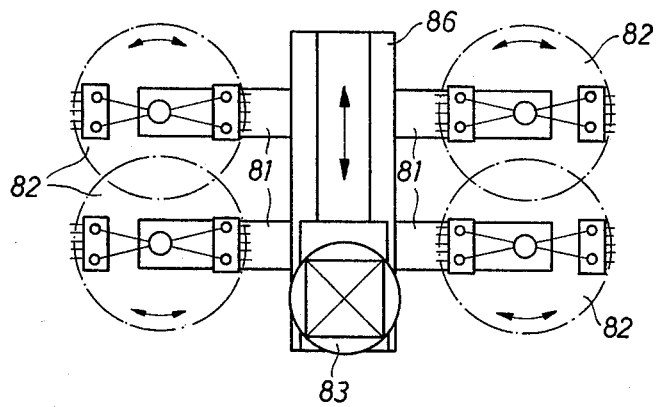

FIG. 13 is a diagrammatic top plan view of a modified production line with two automatic machines each of which is equipped with an interchanging device and which are disposed at the opposite sides of a rotary work holder, the symbols used in FIG. 13 being those shown in FIGS. 9 to 11; and FIG. 14 is a diagrammatic top plan view of a third production line wherein the work is reciprocable and turnable in the space between two pairs of automatic machines equipped with interchanging devices, the symbols used in FIG. 14 being those shown in FIGS. 9 to 11.

Figure 1:
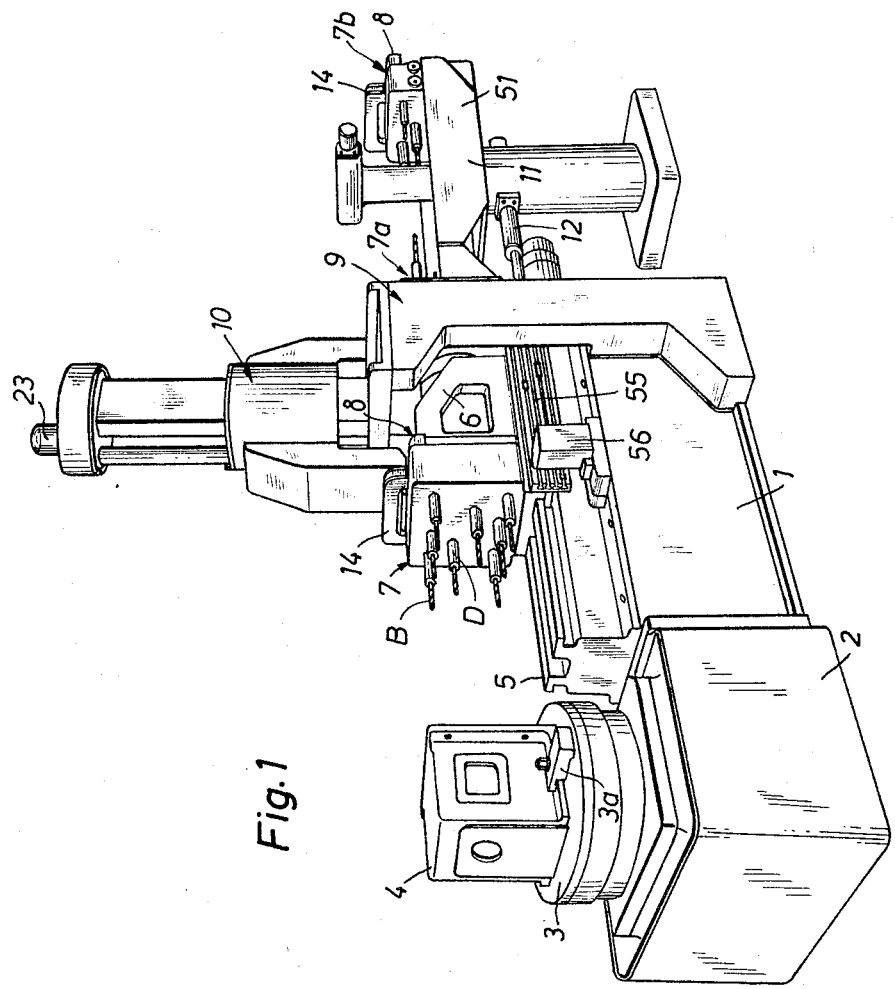
FIG. 1 is a somewhat diagrammatic perspective view of a machine which constitutes a horizontal multiple-spindle boring machine and is constructed and assembled in accordance with a first embodiment of my invention.

Referring first to FIG. 1, there is shown a horizontal boring machine which comprises a main support or frame 1 carrying at its upper side elongated horizontal guide means in the form of rails or ways 5 for a reciprocable supporting structure in the form of a tool slide 6. The slide 6 is detachably connected with a first tool holder 7 which carries a plurality of horizontally and forwardly extending boring tools B mounted in rotary spindles D. The holder 7 includes a top portion 8 which is located at a level above a plurality of units serving to detachably connect the tool holder 7 with the slide 6, to position the tool holder with reference to the slide, to lock the tool holder to the slide, and to couple the drive on the slide with the spindles D of the individual tools B. The construction and operation of such units will be described hereinafter.

The frame 1 is rigidly connected with a pedestal or frame member 2 which is located at the working station and is adjacent to the forward end of the ways 5. This pedestal supports a work holder in the form of a platform or table 3 which is rotatable about a vertical axis and is provided with clamping devices 3a for a workpiece or blank 4. For example, the workpiece 4 may constitute a transmission case, an engine cylinder or the like.

The rear portion of the frame 1 is straddled by an inverted U-shaped support 9 which resembles a gantry and serves to mount a novel inverting or interchanging device 10. Ajacent to the rear portion of the frame 1, there is provided a special magazine or storing device 11 which serves to accommodate one or more spare tool holders 7b.

A further spare tool holder 7a is located in the rear of the support 9. In the illustrated embodiment, the magazine 11 is of the type having a turntable 51 which is rotatable about a vertical axis so that the spare tool holder 7a may be transferred onto the turntable 51 and the latter is thereupon turned through 180 degrees in order to move the spare tool holder 7b into a position ready for transfer onto a predetermined portion of the frame 1 and into the range of the inverting device 10. The turntable 51 may be rotated by an electric, pneumatic, hydraulic or other suitable drive. The means for transferring the tool holder 7a from the predetermined portion of the frame 1 onto the turntable 51 or for transferring the tool holder 7b from the turntable 51 onto such portion of the frame 1 comprises a pneumatic cylinder-and-piston assembly 12.

The numeral 55 denotes an adjustable programming device which cooperates with a switch box 56 and, among its other functions, serves to initiate and control reciprocatory movements of the slide 6 to and from the retracted position shown in FIG. 1. When moved to such retracted position, the slide 6 maintains the tool holder 7 in a lower position in which the inverted U-shaped yoke or suspending means 14 of the tool holder 7 is ready to be engaged by the first displacing or lifting means of the interchanging device 10. The switch box 56 is mounted on the frame 1, and the programming device 55 comprises a series of horizontal grooves and rails which accommodate and support suitably distributed cams or trips capable of opening or closing switches in the box 56 in response to movement of the slide 6 along the ways 5. The programming device 55 is shown as being mounted on the slide 6 and preferably comprises at least one guide rail for each tool holder.

When the slide 6 is moved to its forward position, the tools B of the tool holder 7 will treat the blank 4 at the working station of the boring machine. It is also possible to fix the slide 6 in its retracted position and to reciprocate the blank 4 toward and away from the fixed slide.

Figure 2:
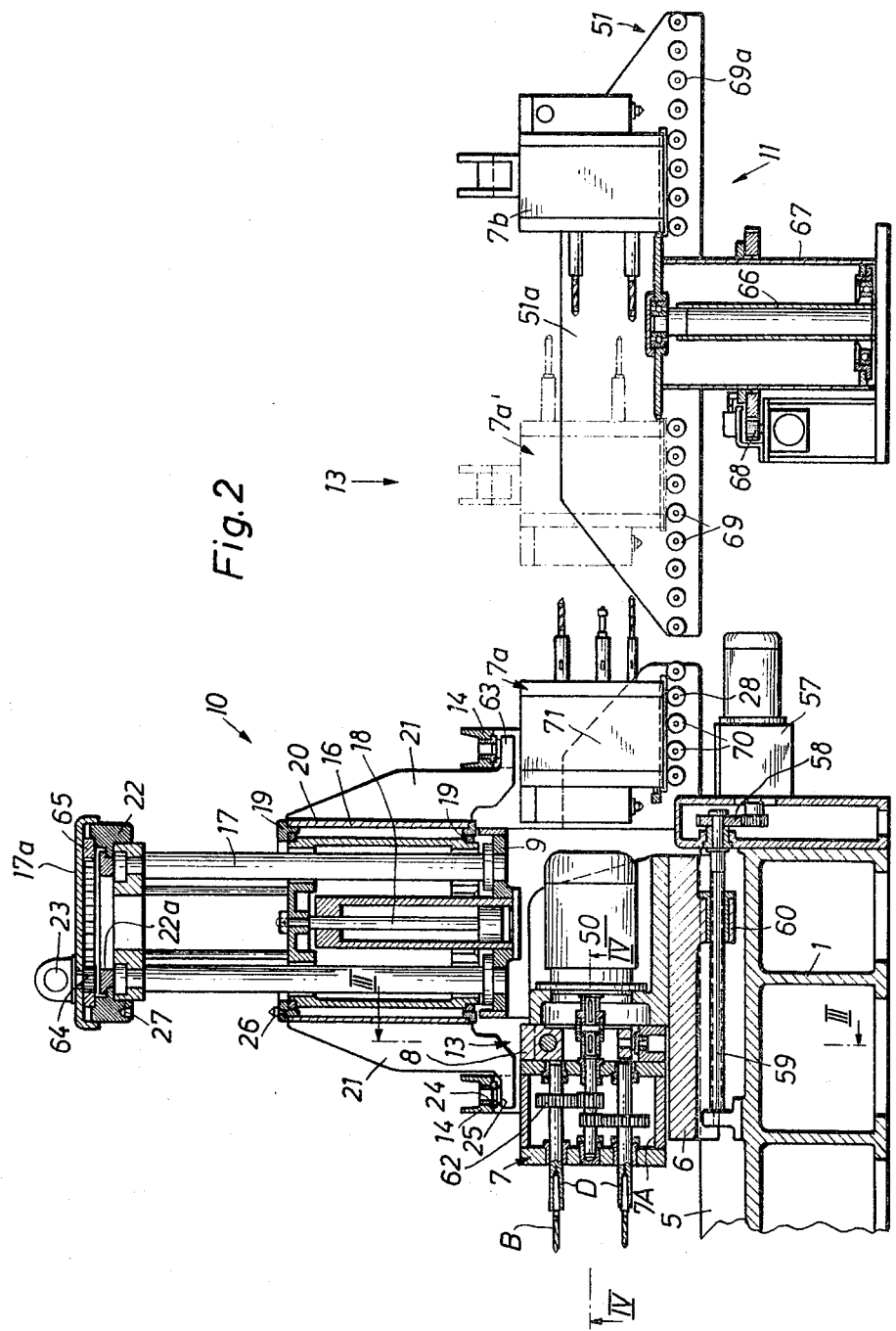
FIG. 2 is a fragmentary longitudinal vertical section through the boring machine of FIG. 1.

FIG. 2 illustrates the machine of FIG. 1 in longitudinal vertical section. The drive for reciprocating the slide 6 along the ways 5 is located at the rear end of the frame 1. This drive comprises an electric motor 57 (preferably of the reversible, variable-speed type), a transmission 58 which is driven by the motor 57, a horizontal lead screw 59 which is rotatably journalled in the frame 1 against axial movement with respect thereto and is driven by the transmission 58, and a nut 60 which meshes with the lead screw 59 and is rigid with the underside of the slide 6.

The drive for the spindles D comprises an electric motor 50 which is rigidly attached to the slide 6. This motor 50 can be coupled to and then drives a transmission 62 which is accommodated in the interior of the tool holder 7. Similar transmissions 62 are provided in each of the spare tool holders 7a and 7b.

The aforementioned positioning unit is indicated by the numeral 13 and comprises cooperating parts provided on the slide 6 and on each of the tool holders 7, 7a and 7b. This positioning unit cooperates with a locking unit which will be described in connection with FIGS. 3, 6 and 7. The positioning unit 13 is shown in greater detail in FIGS. 3 and 5. The coupling unit which serves to establish a driving connection between the motor 50 and the transmission 62 of that tool holder 7 which happens to be connected with the slide 6 is illustrated in FIG. 4.

Each of the tool holders 7, 7a, 7b comprises a casing 7A which accommodates the respective transmission 62 and supports the respective spindles D. The yokes 14 are affixed to the upper portions of the respective casings 7A in such positions that each such yoke extends at a level above the center of gravity of the corresponding tool holder. The yokes 14 can be engaged by the first displacing or lifting means of the inverting device 10 in order to move the respective tool holders to their upper positions, i.e., in a direction substantially at right angles to and away from the ways 5.

The interchanging device 10 comprises two vertical columns 17 which are rigid with and extend above the support 9. The columns 17 guide a carriage 16 which may be reciprocated by a drive including a double-acting pneumatic cylinder-and-piston assembly 18. The upper and lower ends of the carriage 16 are provided with bearing rings 19 for a rotary cylindrical carrier 20, the latter forming part of the first displacing or lifting means as well as of the second displacing or turning means of the interchanging device 10. The carrier 20 is rotatable about a vertical axis but is compelled to share all movements of the carriage 16, i.e., it can move up and down but is also rotatable with reference to this carriage. The carrier 20 is provided with a pair of radially outwardly extending lifting members or arms 21 which are located diametrically opposite each other, and the lower end of each lifting arm 21 is formed with an outwardly extending lifting projection or finger 63 which can enter the space surrounded by the yoke 14 of the respective tool holder. Each finger 63 carries two short upwardly extending male locating members or studs 25 (see particularly FIG. 3) which may enter female locating members or sockets 24 provided in the horizontally extending web 14a of the respective yoke 14. The studs 25 of the left-hand lifting arm 21 shown in FIG. 2 will enter the sockets 24 in the yoke 14 of the tool holder 7 when the slide 6 is moved to the retracted position of FIG. 1 or 2 and the assembly 18 is actuated in a sense to move the lifting arms upwardly.

The second displacing or turning means of the interchanging device 10 further comprises a rotor 22 which is mounted at the upper ends of the columns 17 and is coaxial with the carrier 20. The rotor 22 is rigid with an internal gear 65 which meshes with a drive pinion 64 mounted on the output shaft of an electric drive motor 23 supported by a stationary cover 17a for the rotor 22. The rotor 22 is mounted on a stationary bearing 22a. The means for automatically coupling the carrier 20 with the rotor 22 (when the carrier has been moved to its upper end position) comprises one or more pins 26 extending upwardly from the carrier 20 and receivable in complementary recesses 27 provided at the underside of the rotor 22. It is clear that the position of the male and female motion transmitting portions 26 and 27 may be reversed.

The rear portion of the frame 1 comprises two upwardly extending spaced parallel side walls 71 which are located behind the support 9 at the opposite sides of the spare tool holder 7a. The space between the side walls 71 accommodates a horizontal roller conveyor 70 on which the tool holder 7a rests in a predetermined position when the carrier 20 has been moved to its lower end position. At least one of the rollers which form part of the conveyor 70 may be driven (for example, the roller 28) so as to rotate at least in a clockwise direction and to thereby advance the spare tool holder 7a from such predetermined position toward the magazine 11. The path defined by the conveyor 70 is parallel with the path defined by the ways 5, and these two paths extend radially with reference to the vertical axis of the carrier 20. The arrangement is such that, when the carrier 20 moves to its lower end position and deposits the spare tool holder 7a on the rollers of the conveyor 70, the locating studs 25 on the right-hand lifting arm 21 shown in FIG. 2 are moved below the level of the sockets 24 in the yoke 14 of the spare tool holder 7a so that the latter is free to move away from the right-hand finger 63 and on toward the magazine 11. The same holds true for the tool holder 7 of FIG. 2, i.e., in the position shown in this illustration, the tool holder 7 is disengaged from the left-hand lifting arm 21 and is free to share movements of the slide 6 along the ways 5.

The magazine 11 comprises a fixed vertical post 66 which is surrounded by a rotary cylinder 67 secured to the underside of the turntable 51. The drive 68 for the cylinder 67 is analogous to the drive for the rotor 22 and is operated intermittently, always through such an angle that the turntable 51 will complete one-half of a full revolution. The turntable 51 comprises two upwardly extending side walls 51a which support two roller conveyors 69, 69a, and each of these conveyors comprises at least one driven roller which serves to advance the respective tool holder in directions toward and away from the vertical axis of the turntable 51. The conveyors 69, 69a extend radially with reference to the axis of the rotary cylinder 67, and one thereof registers with the conveyor 70 whenever the turntable 51 comes to a halt. In FIG. 2, the spare tool holder 7a may be moved by the roller 28 of the conveyor 70 so as to be advanced into the range of the transfer means 12 shown in FIG. 1, and such transfer means thereupon advances the tool holder 7a onto the conveyor 69 which, in turn, advances the tool holder 7a to the phantom-line position 7a' of FIG. 2. When the turntable 51 is thereupon turned through an angle of 180 degrees so that the spare tool holder 7b moves to a position corresponding to the phantom-line position 7a' of the tool holder 7a shown in FIG. 2, and when the conveyor 69a is thereupon operated in a sense to move the tool holder 7b away from the axis of the cylinder 67 and into the range of the transfer means 12, the latter can advance the tool holder 7b onto the conveyor 70 which is then driven in a sense to move the tool holder 7b to a predetermined position corresponding to the solid-line position of the tool holder 7a.

The heretofore described components of the automatic machine shown in FIGS. 1 and 2 are operated as follows:

When the boring tools B of the tool holder 7 have completed the treatment of the workpiece 4 at the working station, the programming device 55 produces a signal which causes one of the switches in the box 56 to reverse the motor 57 so that the slide 6 is moved back to the retracted position of FIG. 1 or 2. The slide 6 is automatically arrested in such retracted position by means of a suitable limit switch or the like (not shown) which arrests the motor 57 whereby the finger 63 of the left-hand lifting arm 21 extends into the space enclosed by the yoke 14 of the thus retracted tool holder 7. The locating studs 25 on the left-hand lifting arm 21 register with but are still spaced from the corresponding sockets 24 because the carrier 20 is held in its lower end position. A further cam, switch, valve or analogous control element (not shown) then causes the components of the positioning unit 13 to become disengaged from each other and disengages the coupling between the motor 50 on the slide 6 and the transmission 62 in the casing 7a of the tool holder 7. A solenoid valve or an analogous control element (not shown) thereupon admits pressure fluid into the lower chamber of the cylinder-and-piston assembly 18 so that the carrier 20 moves upwardly and lifts the tool holders 7 and 7a from their lower positions to their respective upper positions in which the tool holders can turn through an angle of 180 degrees without striking against the support 9 or against other parts of the machine. In response to such upward movement of the carrier 20, the motion transmitting pin 26 automatically enters the recess 27 of the rotor 22 so that the lifting arms 21 will begin to rotate about the axis of the carrier 20 as soon as the motor 23 of the turning means is started. A suitable limit switch or the like terminates the flow of pressure fluid into the lower chamber of the assembly 18 as soon as the carrier 20 is properly coupled to the rotor 22, and such limit switch may start the motor 23 so that the carrier 20 is turned through an angle of 180 degrees whereby the lifted tool holders 7 and 7a exchange positions, i.e., the tool holder 7a is located at a level above the slide 6 which latter remains in retracted position. As soon as the rotor 22 completes its angular movement through 180 degrees, a further control element admits pressure fluid to the upper chamber of the assembly 18 so that the carriage 16 lowers the carrier 20 and the latter deposits the tool slide 7 on a predetermined portion of the conveyor 70. At the same time, the tool holder 7a assumes the position previously occupied by the tool holder 7 and is ready to be positioned, locked and coupled to the slide 6. Such positioning, locking and coupling takes place in response to an electric or pneumatic signal, and a further signal is produced to thereupon move the slide 6 from its retracted position so that the tools on the tool holder 7a are advanced toward and into engagement with the workpiece 4. The treatment of the workpiece 4 by the tools of the tool holder 7a requires a certain amount of time, and this interval is utilized to transfer the tool holder 7 into the magazine 11 as well as to transfer the spare tool holder 7b onto the conveyor 70. The carrier 20 remains in its lower end position so that the tool holder 7 may be moved away from the corresponding lifting arm 21 and that the yoke 14 of the spare tool holder 7b may be located in a position in which it is ready to be engaged by the corresponding finger 63 for movement to the upper position.

In order to transfer the tool holder 7 onto the conveyor 69 of the turntable 51, the machine starts the roller 28 of the conveyor 70 so that this roller rotates in a clockwise direction, as viewed in FIG. 2, and advances the tool holder 7 into the range of the transfer means 12. This transfer means thereupon advances the tool holder 7 onto the conveyor 69 one roller of which is set in rotary motion so as to move the tool holder 7 to the position corresponding to the phantom-line position 7a' of FIG. 2. It is clear, however, that the combined conveyor and transfer means 69, 69a, 70 and 12 may be replaced by any other suitable conveying system or transfer system which is capable of moving the tool holders to and from the magazine 11.

Once the tool holder 7 is properly located on the magazine 11, the drive 68 is set in motion and turns the turntable 51 through an angle of 180 degrees to place the conveyor 69a into registry with the conveyor 70. One roller of the conveyor 69a is then driven in a counterclockwise direction, as viewed in FIG. 2, to move the tool holder 7b into the range of the transfer means 12 and the latter transfers the tool holder 7b into the space between the side walls 71, i.e., onto the conveyor 70 whose roller 28 is set in motion to complete the transfer of the tool holder 7b into a predetermined lower end position such as is required to insure that the tool holder 7b will be lifted in response to upward movement of the carrier 20.

The magazine 11 may be replaced with a magazine having room for three, four, five, six or more tool holders. Thus, the turntable 51 may be replaced with a star-shaped turntable each radially extending portion or arm of which can accommodate at least one tool holder. Still further, the magazine 11 may be provided with a shelf for a large number of tool holders and with a crane or another suitable hoisting device which can rearrange the tool holders on the shelf in such a way that the tool holder next in line for transfer to the slide 6 is in proper position for advance onto the conveyor 70. Also, the crane may be used to transfer tool holders from the conveyor 70 and directly into the magazine, or vice versa. Moreover, the magazine may be equipped with an endless elevator such as an endless chain conveyor, bucket conveyor, apron conveyor or any other suitable conveying arrangement which can move tool holders into and out of registry with the conveyor 70.

It is preferred to construct the programming device 55 of the machine in such a way that the transfer of tool holders to and from the magazine 11 (or to and from an analogous magazine) will take place in a fully automatic way. The exact construction of such programming devices is known and by itself forms no part of the present invention. It suffices to say here that the programming device 55 may regulate movements of the tool holders to and from engagement with the slide 6, movements of the slide 6 along the ways 5, as well as the transfer of tool holders between a predetermined portion of the frame 1 and a magazine.

Figure 3:
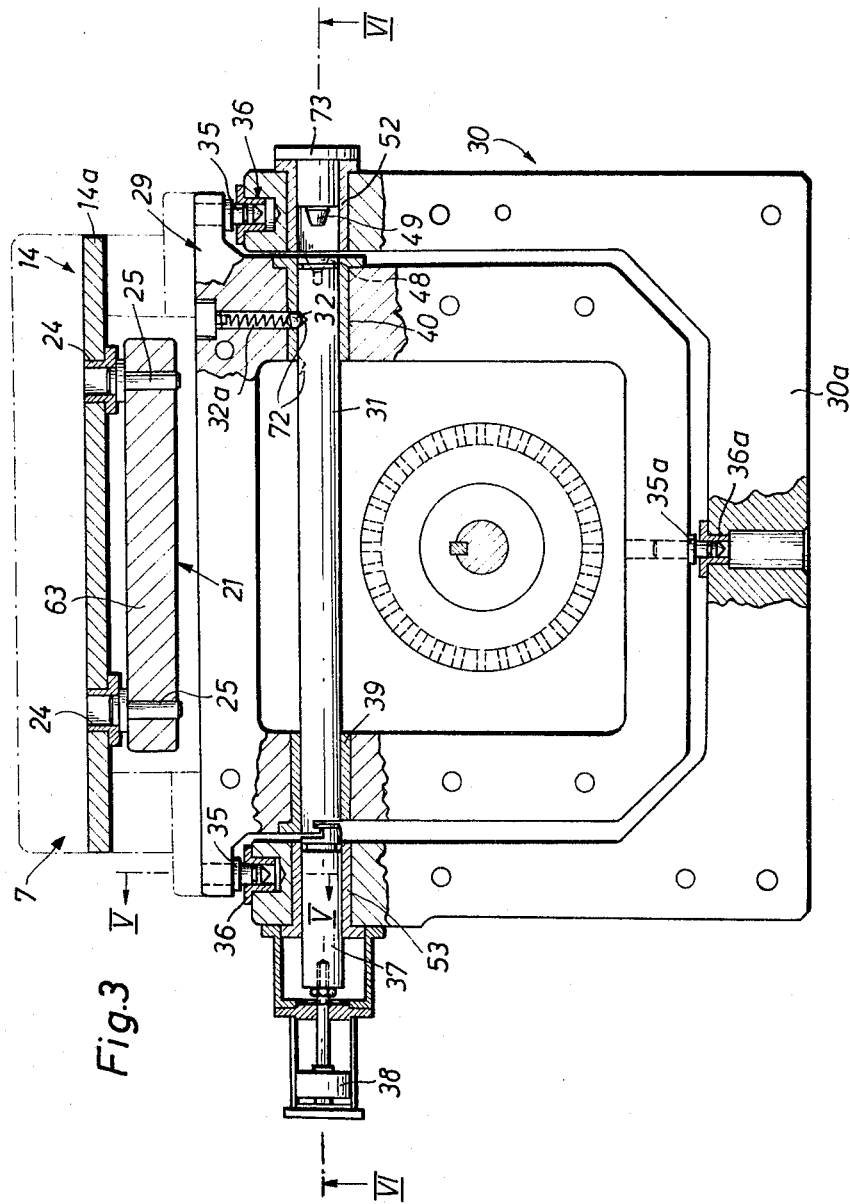
FIG. 3 is an enlarged fragmentary transverse vertical section as seen in the direction of arrows from the line III—III of FIG. 2 and illustrates the construction of two units which respectively serve to position and to lock a tool holder to the slide.
Figure 4:
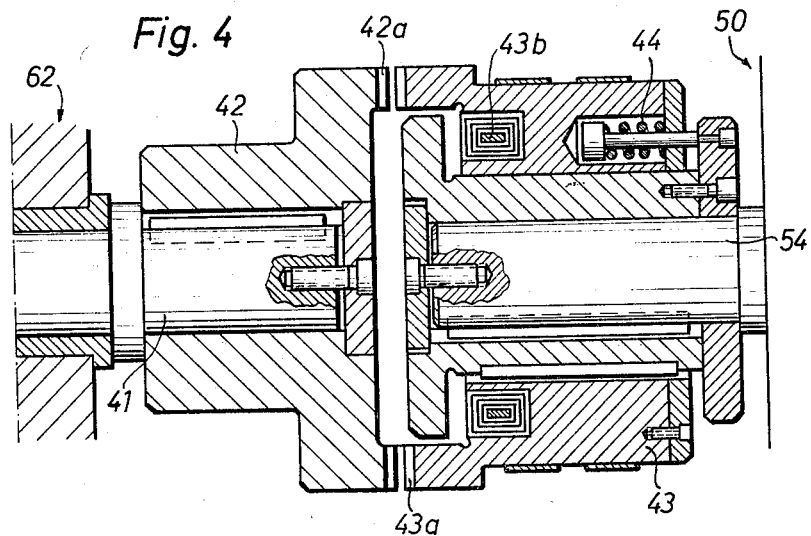
FIG. 4 is an enlarged fragmentary section as seen in the direction of arrows from the line IV—IV of FIG. 2 and illustrates the coupling between a drive motor on the slide and a transmission in the casing of that tool holder which is locked to the slide.

The positioning unit 13 which serves to properly locate the tool holder 7, 7a or 7b with reference to the slide 6 is illustrated in FIG. 3. The tool holder 7 which has been elected for illustration in FIG. 3 is rigid with a frame-like male positioning element or extension 29 which is receivable in a substantially U-shaped female positioning element or receptacle 30 secured to the slide 6, not shown in FIG. 3. The top faces of the upwardly extending flanges of the receptacle 30 are provided with cylindrical sockets 36 which can receive cylindrical positioning or centering pins 35 mounted on the extension 29 of the tool holder 7. A further socket 36a is provided in the central portion of the horizontal web 30a forming part of the receptacle 30, and this socket 36a may receive a third positioning or centering pin 35a mounted at the lowermost end of the extension 29. The open side of the receptacle 30 faces upwardly so that the extension 29 may enter the receptacle when the tool holder 7 descends with one of the lifting arms 21. The exact construction and configuration of the pins 35, 35a and sockets 36, 36a will be described in connection with FIG. 5.

The extension 29 of the tool holder 7 carries certain components of the locking unit which serves to securely attach the tool holder to the slide 6 for movement along the ways 5 but only after the extension 29 is properly positioned with reference to the receptacle 30. This locking unit comprises two coaxial but spaced bearing sleeves 39, 40 which are mounted in the downwardly extending vertical arms of the extension 29 and define a composite bore arranged to accommodate a reciprocable locking bolt 31. The bolt 31 is formed with axially spaced notches 72 each adapted to receive the ball 32 of a detent means mounted in the extension 29 and serving to yieldably hold the bolt 31 in a selected axial position. The ball 32 is biased by a prestressed helical spring 32a.

When the extension 29 is properly positioned in the receptacle 30, the bores of the bearing sleeves 39, 40 respectively register with the bores of bearing sleeves 53, 52 in the flanges of the receptacle 30. The outer end of the sleeve 52 is closed by a stopper or plug 73 having at its inner end a frustoconical portion or tip 49 which can extend into a complementary recess 48 in the right-hand end face of the locking bolt 31. The manner in which the recess 48 of the bolt 31 may receive the tip 49 will be described in connection with FIGS. 6 and 7. The plug 73 is threaded in or otherwise secured to the bearing sleeve 52.

The bearing sleeve 53 guides a plunger 37 forming part of a pneumatic cylinder-and-piston assembly 38, hereinafter called shifting device, which serves to move the locking bolt 31 axially into and out of the bearing sleeve 52. The parts 31, 37 are provided with cooperating hook-shaped claws 45, 46 which form a coupling and insure that the locking bolt 37 is compelled to share axial movements of the plunger 37 when the extension 29 is properly positioned with reference to the receptacle 30. The exact configuration of the claws 45, 46 will be described with reference to FIG. 6.

When the left-hand lifting arm 21 of the carrier 20 shown in FIG. 2 descends to its lower end position, the extension 29 of the tool holder 7 automatically enters the space defined by the receptacle 30 of the slide 6 because the tool holder 7 is held in requisite position by the locating studs 25 which extend into the corresponding sockets 24. Therefore, the pins 35, 35a of the extension 29 will enter the respective sockets 36, 36a to properly position the tool holder 7 with reference to the slide 6. This moves the bearing sleeves 39, 40 into registry with the bearing sleeves 53, 52 so that the plunger 37 of the shifting device 38 is aligned with the locking bolt 31. At the same time, the downwardly extending claw 45 of the locking bolt 31 engages the upwardly extending claw 46 of the plunger 37 so that the latter is properly coupled with the locking bolt and can transmit motion thereto. The shifting device 38 receives an electrical, magnetic or other signal as soon as the extension 29 is accurately positioned with reference to the receptacle 30, and the plunger 37 thereupon performs a forward stroke (i.e., in a direction to the right, as viewed in FIG. 3) to advance the right-hand end portion of the locking bolt 31 into the bearing sleeve 52 so that the tip 49 of the plug 73 penetrates into the recess 48. At the same time, the plunger 37 extends into the sleeve 39 of the extension 29 so that the latter is securely locked to the receptacle 30 and couples the tool holder 7 with the slide 6. The ball 32 of the detent means then extends into the left-hand notch 72 of FIG. 3.

Once the tool holder 7 is properly locked to the slide 6, the machine automatically couples the motor 50 with the transmission 62 for the spindles D in the following manner: The signal for operating the coupling may be produced by the shifting device 38 at the time the tip 49 of the plug 73 is properly received in the recess 48 of the locking bolt 31. The motor 50 comprises an output shaft 54 (see FIG. 4) which carries a first clutch element 43 having an annulus of teeth or claws 43a. The transmission 62 comprises an input shaft 41 which carries a second clutch element 42 having an annulus of teeth or jaws 42a which may be engaged and driven by the teeth 43a when the clutch element 43 is moved axially toward the input shaft 41. The clutch element 42 extends through the receptacle 30 of the positioning unit 13, see FIG. 3. The clutch element 43 is permanently biased by one or more helical retracting springs 44 tending to move the teeth 43a away from and out of engagement with the teeth 42a on the clutch element 42. When the shifting device 38 sends a suitable signal, the clutch element 43 is moved axially and against the bias of resilient means 44 in response to energization of an electromagnet 43b. When the electromagnet 43b is energized, it produces a signal which starts the motor 50 and the latter produces a signal which starts the motor 57 in a sense to feed the slide 6 and the tool holder 7 toward the workpiece 4. The parts 43b and 44 together constitute an actuating means which can reciprocate the clutch element 43 toward and away from the clutch element 42.

It will be understood that the position of the male and female positioning elements 29, 30 may be reversed, i.e., that the slide 6 may carry an element 29 and that each tool holder may carry an inverted U-shaped element 30.

The positioning and locking operations must be carried out with utmost precision, particularly if the machine is used for precision finishing of workpieces. In other words, the positioning unit 13 must be constructed and assembled in such a way that the tool holder 7 may be locked to the slide 6 with utmost accuracy despite the fact that certain components of the locking unit and/or positioning unit 13 might come in contact with dust, dirt, shavings, chips, fragments of metal and similar contaminants. This can be achieved by resorting to sharp positioning pins and by insuring that the cooperating positioning and locking elements do not abut against each other along surfaces which are normal to the direction of movement. Consequently, any particles of foreign matter which happen to enter between the cooperating positioning and locking elements are automatically moved out of the way and cannot affect the final position of the tool holder 7 with reference to the slide 6. The sharply defined edges and/or shoulders of male positioning and locking elements must be hard enough to cut through relatively small particles of foreign matter or to push such particles in front of them and out of the way. An edge or shoulder is considered to be sharp if its radius of curvature is less than 0.05 mm., normally between 0.02–0.05 mm.

Figure 5:
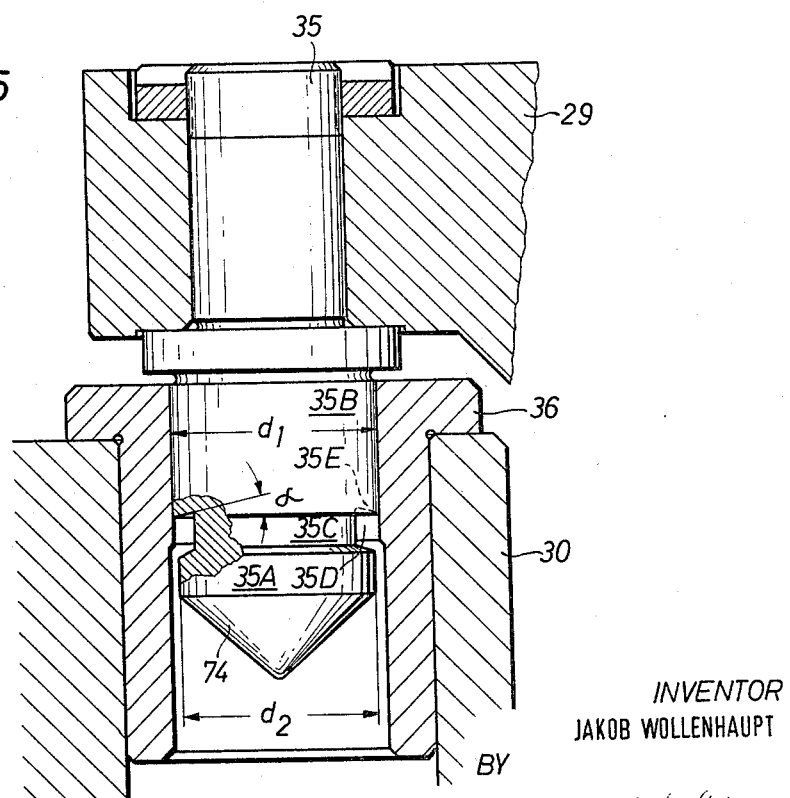
FIG. 5 is an enlarged fragmentary vertical section as seen in the direction of arrows from the line V—V of FIG. 3 and illustrates the construction of cooperating male and female positioning elements forming part of the positioning unit which locates a tool holder with reference to the slide.

FIG. 5 illustrates, by way of example, the configuration and dimensioning of a centering or positioning pin 35 and of the corresponding socket 36. The pin is of the multi-stage type, i.e., it includes a front section 35a having a diameter d2 and a rear section 35B having a diameter d1 which exceeds the diameter d2 and corresponds with considerable accuracy to the internal diameter of the socket 36. The front section 35A effects coarse positioning and the rear section 35B effects accurate or final positioning of the pin 35. As a rule, the difference between the diameters d1 and d2 will be in the range of 0.02–0.05 mm. The diameter d1 is selected in such a way that the rear section 35B is received in the socket 36 with a sliding fit of the Isa-class 5.

The pin 35 is formed with a conical tip 74 which is located at the front end of the section 35A. The sections 35A, 35B are connected with each other by a neck portion 35C surrounded by a circumferential groove 35D. The rear end of the groove 35D is bounded by an inwardly inclined annular shoulder 35E making with the diameter d1 a small acute angle alpha. The annular edge portion of the shoulder 35E is rather sharp and pushes in front of it any such foreign matter which might happen to adhere to the internal surface of the socket 36. The shoulder 35E has a tight sliding fit in the socket 36.

The configuration of the pin 35a and socket 36a is analogous.

Referring now to FIG. 6, there is shown the locking unit which secures the extension 29 of the tool holder 7 to the receptacle 30 of the slide 6. The locking bolt 31 is provided with a smaller-diameter front section 31A whose front and face is formed with the aforementioned recess 48, and with a rear section 31B which has an accurate sliding fit in the bearing sleeves 39 and 40. The difference between the diameters of the sections 31A, 31B may be between 0.02 and 0.05 mm. The bolt 31 is further provided with a sharply defined annular shoulder 31E having a tight sliding fit in the bore of the sleeve 40. The claw 45 of the locking bolt 31 resembles a hook and extends downwardly so that it may enter into the space defined by the upwardly extending claw 46 of the plunger 37. The claws 45, 46 are provided with abutting inclined contact surfaces 47 which prevent any axial play when the plunger 37 moves in a direction to the right and pushes the locking bolt 31 into the bearing sleeve 52 of the receptacle 30. During such axial displacement of the locking bolt 31, its front section 31A advances toward the plug 73 so that the tip 49 penetrates into the recess 48. The tip 49 is preferably eccentric with reference to the axis of the locking bolt 31 (see FIG. 7) so that this tip becomes wedged in the recess 48, i.e., the mantle of the tip 49 does not move in full contact with the internal surface of the front section 31A. The construction of the shifting device 38 is such that fluid admitted into the cylinder of this device maintains the plunger 37 under at least some pressure when the tip 49 is properly received in the recess 48 so that the parts 31 and 37 constitute a rigid unit which keeps the extension 29 against any, even minimal, wobbling with reference to the slide 6. In other words, the connection between the slide 6 and that tool holder (7, 7a or 7b) which happens to be locked thereto is free of any play (within the aforementioned tolerances) to make sure that the boring tools B can perform their intended operation upon the workpiece 4 with utmost accuracy and regardless of the presence of foreign matter which tends to affect the accuracy with which the tool holder is locked to the slide.

It will be seen that each of the pins 35, 35a automatically finds its way into the respective socket 36, 36a to make sure that the extension 29 is accurately positioned on the slide 6. For the very unlikely event that the pins 35, 35a cannot fully enter the respective sockets, the machine tool is preferably provided with an electric or other signal generating device (not shown) which produces a visible, audible or otherwise detectable signal and/or arrests the machine until the obstruction is removed.

The plunger 37 also comprises a front section 37A and a rear section 37B. The difference between the diameters d1 and d2 of the sections 37A, 37B may be between 0.02–0.05 mm.

It will be seen that the machine of FIGS. 1 and 2 comprises three main components, namely, a horizontal boring machine proper whose frame 1, pedestal 2, platform 3, ways 5 and certain other components may consist of known parts; the positioning and locking units of FIGS. 3 and 5 to 7 which can automatically locate and hold a tool holder 7, 7a or 7b within a matter of seconds; and the interchanging device 10 which can move at least two tool holders at a time in such a way that the tool holder which was locked to the spindle 6 may switch positions with or be replaced by a spare tool holder 7a or 7b which has been placed into an accurately determined position ready for transfer into operative engagement with the slide 6 and motor 50. In a sense, the magazine 11 (or an analogous magazine) may be considered as forming part of the interchanging device 10 because the magazine may be constructed and positioned in such a way that the interchanging device will deliver or receive tool holders directly from the magazine. It is further clear that the frame 1 may be constructed with a view to support two or more spare tool holders at a time; in such machines the carrier 20 will be rotated through less than 180 degrees when the tool holder 7 is to be replaced by another tool holder. This will be readily understood because the machine may comprise two or more magazines which can be equidistant from each other and may surround the carrier 20 in such a way that the latter must be turned through angles of 120°, 90°, 60°, etc. depending upon whether the machine is provided with two, three, five or more magazines. For example, and assuming that the machine shown in FIG. 1 is provided with two magazines 11 which are equidistant from each other and from the slide 6, the carrier 20 will have to turn through 120 degrees in order to deliver the tool holder 7 to the first magazine and to simultaneously transfer a spare tool holder from the second magazine and into registry with the slide 6. The carrier 20 may be mounted for rotation in a single direction or for rotation in opposite directions, depending upon whether one of the magazines merely receives tool holders and the other magazine merely places spare tool holders into a position for delivery to the slide 6, or whether the carrier should transfer to the slide tool holders from either of the two magazines. All such modifications are so obvious in view of the preceding disclosure that each thereof will be readily comprehended without necessitating additional illustrations.

The improved machine may form part of an automatic or semiautomatic production line which can but need not be equipped with automatic transfer machines for workpieces. A few specific examples of the various manners in which the improved machine may be put to use are illustrated in FIGS. 12, 13 and 14 by utilizing simple symbols which are shown in FIGS. 8 to 11.

FIG. 8 illustrates a symbol 80 which represents a simple work holder. FIG. 9 shows a horizontal multiple spindle boring machine 81 with a single tool holder. FIG. 10 shows an interchanging device 82 (corresponding to the interchanging device 10 of FIGS. 1 and 2) which serves to automatically deliver and remove tool holders from registry with the slide. FIG. 11 illustrates a rotary work holder 83 (corresponding to the platform 3 of FIG. 1) which is provided with an automatic indexing device to move the workpiece into a plurality of angular positions.

Even in its elementary form, i.e., without the magazine 11 and with room for a single spare tool holder 7a and 7b, the machine of FIGS. 1 and 2 constitutes a substantial improvement over and further development of heretofore known multiple-spindle boring machines. This will be readily understood since either of the tool holders 7, 7a or 7, 7b or 7a, 7b may be rapidly and accurately transferred to or from the slide 6. For example, the machine may comprise the tool holders 7 and 7a whereby the tools on the tool holder 7 are used for rough drilling and the tools on the tool holder 7a are used for tapping of bores produced by the tools of the tool holder 7. As a rule, the time required for tapping is but a fraction of the time required for rough boring; therefore, a relatively small manufacturing plant which heretofore utilized a separate boring machine and a separate thread cutting or tapping machine can use the machine of FIGS. 1 and 2 to perform both such operations with resultant savings in space, time, personnel, initial cost and maintenance cost. The interchanging of tool holders 7 and 7a requires less time than is needed to advance the workpiece from a boring machine to a separate tapping machine.

The important savings in time, space, initial and maintenance cost, and personnel are even more pronounced when the improved machine is combined with a series of identical or different machine tools to form a complete production line and to cooperate with transfer machines for advancing the workpieces to consecutive working stations. One such production line is shown in FIG. 12 which utilizes symbols of the type illustrated in FIGS. 8 to 11. The production line shown in FIG. 12 includes a total of eight multiple-spindle boring machines 81 which are disposed in transversely aligned pairs at the opposite sides of the path for the workpieces. The workpieces advance in stepwise fashion in the direction indicated by an arrow 84 and are supported on simple work holders 80. If the workpieces must be clamped at each of the four working stations shown in FIG. 12, they may be advanced by an endless belt conveyor or the like. However, if the workpieces are mounted on the work holders 80, the arrangement of FIG. 12 must comprise an endless conveyor which will advance the work holders 80 in an endless path extending between the four pairs of machines 81, thereupon past a take-off station, and finally past a loading station where each of the work holders 80 receives a fresh blank. For example, such endless conveyor for the work holders 80 may comprise a lower stringer which passes between the machines 81 and an overhead stringer which serves to return empty work holders back toward the first pair of machines 81.

The production line of FIG. 12 comprises a total of five interchanging devices 82 three of which are located at the right-hand side of the path for the work holders 80. It is assumed that the third right-hand machine 81a requires the longest interval of time to complete its treatment of the momentarily aligned workpiece; for example, the machine 81a may be used for heavy-duty boring or drilling. Consequently, all of the machines 81 which are equipped with an interchanging device 82 have enough time at their disposal to exchange the tool holders in addition to completing the respective treatment of workpieces. Also, the machines which are provided with such interchanging devices 82 may complete two or more treatments while the machines without interchanging devices complete a single treatment. Were the production line of FIG. 12 assembled exclusively of machines 81 without interchanging devices 82, its length L1 would be increased at least to the length L2 or even more. Of course, if each of the machines shown in FIG. 12 cooperates with an interchanging device 82, the resulting production line is even more versatile and may be used to subject the workpieces to an exceptionally large number of treatments.

Each machine which is equipped with an interchanging device may be rapidly and conveniently converted for a different operation on the same workpiece or for treatment of different workpieces. This feature of the improved machine is of particular importance in medium-sized and smaller manufacturing or processing plants wherein the number of serially treated workpieces is relatively low. Heretofore, a production line with a series of machines was rarely used to full capacity when it was needed for treatment of a few workpieces or a relatively small number of workpieces. However, rapid conversion for treatment of different workpieces enables the improved machine to be assembled with one or more additional machines into a production line which can be rapidly and conveniently converted for treatment of various types of workpieces and utilizes only such tool holders and tools which are absolutely necessary for a particular manufacturing operation. In other words, the tool holders carrying all such tools which are needed for treatment of the same type of workpieces or of different types of workpieces may be made ready and are thereupon moved to and from the respective working stations in the previously described manner. It is well known that the conversion of a conventional production line for treatment of different types of workpieces often requires days or weeks, whereas a production line of the type shown in FIG. 12 may be converted within a matter of minutes or seconds, i.e., practically without any interruption in the manufacturing process. The versatility of the production line improves with increasing number of interchanging devices. All of the tool holders may be held ready in the respective magazines and may be moved to the corresponding working stations in response to a single signal from the programming device. Thus, a production line which utilizes one or more machines of the type shown in FIGS. 1 and 2 may be used with equal advantage for processing of large numbers of serially advanced workpieces, as well as for treatment of individual workpieces or a small number of consecutive blanks each of which must be subjected to one, two or more treatments. The conversion is practically instantaneous and, as stated above, can be carried out without any interruptions in the feed of workpieces.

It is clear that the improved machine may carry tools which, in addition to or instead of boring or tapping, can perform a variety of other operations such as reaming, milling, turning and the like. Of course, the machine is also suited for use in production lines which are constructed for uninterrupted treatment and finishing of a single type of work, such as transmission cases, engine cylinders or other bulky workpieces which must be subjected to a series of treatments and which are large enough to allow for simultaneous treatment by two or more sets of tools. Such machines which are used mainly for large-scale treatment or finishing of the same type of workpieces were seldom economical in relatively small and medium-sized plants wherein each machine preferably should be capable of carrying out two or more different operations, i.e., wherein the machines are frequently converted for treatment of different workpieces. A multiple-spindle boring machine of conventional design was seldom used in relatively small plants because the retooling consumes too much time so that the manufacturer normally prefers to use a series of simpler but more versatile machine tools.

FIG. 13 illustrates a combination of two machines 81 each of which is equipped with an interchanging device 82 and which are disposed at the opposite sides of a rotary work holder 83. Were the interchanging devices 82 omitted, the machines 81 could treat only two sides of the workpiece which is mounted on the holder 83 excepting, of course, if the workpiece would require identical treatment at two of its sides. However, since each of the machines 81 is equipped with an interchanging device 82, each side of a substantially block-shaped workpiece may be subjected to a different treatment. Also, each side of the workpiece may be treated by tools carried by two or more different tool holders.

Referring finally to FIG. 14, there is shown a production line which comprises two pairs of machines 81 and of which is provided with an interchanging device 82. The work holder 83 is rotatable about a vertical axis and is also movable in the longitudinal direction of a table 86 (see the double-headed arrow). This production line is so versatile that it can subject each side of a prismatic or analogous workpiece to any desired number of treatments which can be carried out at either of the two working stations, or in part at the one and in part at the other working station.

It is to be understood that the production lines shown in FIGS. 12 to 14 are but a few examples of possible combinations which may be assembled by utilizing one or more machines of the type described in connection with FIGS. 1 to 7. The number of possible variations is practically inexhaustible and the exact nature of the production line will depend on the space which is available in a small, medium-sized or large manufacturing plant, on the number of machines with interchanging devices which are available to the owner, whether the workpieces must be treated at two sides only (see FIG. 12), or whether the workpieces must be rotated with or with reference to their holders (FIGS. 13 and 14). Also, the nature of the workpieces will be a determining factor in distributing the machines at the opposite sides of the path in which the workpieces are being advanced along consecutive working stations. For example, and referring again to FIG. 13, this production line can comprise three or more machines which extend radially with reference to the work holder 83. Also, and referring to FIG. 14, it is often sufficient if the production line comprises two machines at one side and a single machine at the other side of the table 86.

It will be seen that, by using machines of the type shown in FIGS. 1 and 2, the designer of a production line has a practically inexhaustible choice of various combinations, the same as if all of the machines were assembled of identical components. Also, the machine of my invention may be used in connection with the treatment of a large variety of workpieces and may be readily and rapidly converted for treatment of such workpieces which were not even contemplated at the time the machine was purchased and set up in a manufacturing plant. Each such conversion requires an interval of time which is but a small fraction of the time necessary for conversion of heretofore known machine tools.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine tool, a frame; elongated guide means on said frame; a slide reciprocable along said guide means; a first tool holder detachably connected with said slide; at least one spare tool holder; and interchanging means for replacing said first holder with a spare holder, comprising first displacing means operative to move the first holder and a spare holder in directions substantially normal to and toward and away from said guide means, and second displacing means for turning the holders upon movement away from said guide means so that the spare holder assumes the position previously occupied by said first holder and is ready to be connected with said slide on movement toward said guide means.

2. In a machine tool, a frame; elongated substantially horizontal guide means provided on said frame; a slide reciprocable along said guide means to and from a retracted position; a first tool holder detachably connected with said slide; a spare tool holder; and interchanging means for replacing said first holder with said spare holder, comprising lifting means for moving said holders vertically between upper and lower positions in retracted position of said slide, and means for turning the holders in said upper positions thereof through such an angle that the spare holder is automatically connected with said slide on subsequent movement to its lower position.

3. In an automatic multiple spindle machine, a frame provided with horizontal guide means; a tool slide mounted on said guide means for movement between a working station and a retracted position; drive means provided on said slide; a first multiple-spindle tool holder detachably mounted on said slide for movement therewith; coupling means for automatically coupling said drive with the spindles of said tool holder when the latter is mounted on the slide; a spare multiple-spindle tool holder spaced from said first tool holder; and interchanging means for replacing said first tool holder with said spare tool holder in retracted position of said slide, comprising lifting means for simultaneously moving said tool holders between lower and upper positions, and turning means for turning said tool holders about a vertical axis in the upper positions thereof and through such an angle that said spare tool holder is automatically connected with said slide on movement to its lower position.

4. A structure as set forth in claim 3, wherein said lifting means comprises a pair of lifting members each arranged to engage one of said tool holders in retracted position of said slide and an assembly for reciprocating said lifting members in parallelism with said vertical axis, said lifting members being rotatable about said axis and said turning means comprising rotor means for rotating the lifting members in response to movement of said tool holders to respective upper positions.

5. A structure as set forth in claim 4, further comprising a support for said interchanging means, said support resembling a gantry which straddles said frame and including at least one vertical column supporting said rotor and arranged to guide said lifting members during movement toward and away from said guide means, said lifting means further comprising a carrier rigid with said lifting members and rotatable therewith about said vertical axis, said carrier and said rotor having cooperating male and female motion transmitting portions for rotating said carrier and said lifting members in the upper position of said tool holders.

6. In an automatic multiple spindle machine, a frame provided with horizontal guide means; a tool slide movable along said guide means to and from a retracted position in which the slide is spaced from the work; a first tool holder detachably connected for movement with said slide; a first sphere tool holder on a predetermined portion of said frame; interchanging means for replacing said first tool holder with said spare tool holder, comprising lifting means for moving said tool holders vertically between upper and lower positions in said retracted position of the slide, and turning means for turning the tool holders in said upper positions thereof through such an angle that the spare tool holder is automatically connected with said slide on subsequent movement to lower position and the first tool holder comes to rest on said predetermined portion of the frame; a magazine adjacent to said frame; at least one second spare tool holder in said magazine; and transfer means for exchanging tool holders between said magazine and said predetermined portion of the frame.

7. A structure as set forth in claim 6, wherein said magazine comprises a turntable rotatable about a vertical axis and arranged to support at least two tool holders, and drive means for rotating said turntable about the respective axis and through such an angle that, in response to each rotation thereof, said turntable moves a tool holder thereon into position for transfer to said predetermined portion of the frame or is ready to receive a tool holder from the frame.

8. A structure as set forth in claim 6, wherein said magazine comprises a star-shaped turntable rotatable about a predetermined axis and including a plurality of radially extending portions each of which is arranged to support at least one tool holder, and drive means for rotating said turntable through such angles that, upon each angular displacement thereof, the turntable places a tool holder in a position for transfer to said predetermined portion of the frame or is ready to receive a tool holder from the frame.

9. A structure as set forth in claim 6, wherein said magazine comprises an endless elevator arranged to support a plurality of tool holders and drive means for moving the elevator in stepwise fashion so that, upon each movement thereof, the elevator places a tool holder in a position for transfer to said predetermined portion of the frame or is ready to receive a tool holder from said predetermined portion.

10. In an automatic multiple spindle machine, a frame provided with horizontal guide means; a tool slide mounted on said guide means and movable to and from a retracted position; drive means provided on said slide; a first multiple-spindle tool holder positioned on said slide for movement therewith, said tool holder being movable up and down with reference to said slide; locking means for detachably securing said tool holder to said slide; coupling means provided on said tool holder and on said slide for connecting said drive with the spindles of the tool holder on locking of the tool holder to the slide; a spare multiple-spindle tool holder angularly spaced from said first tool holder with reference to a vertical axis; and interchanging means for replacing said first tool holder with said spare tool holder on disengagement of said locking means and in retracted position of said slide, said interchanging means comprising lifting means for simultaneously moving said tool holders vertically between lower positions and upper positions in which said tool holders are located at a level above said slide, and turning means for turning said tool holders about said axis through such an angle that said spare tool holder is automatically positioned for locking to said slide on subsequent movement to its lower position.

11. In an automatic multiple spindle machine, a frame provided with horizontal guide means; a tool slide mounted on said guide means and movable to and from a retracted position; a first multiple-spindle tool holder; positioning means for locating said tool holder on said slide; a spare multiple-spindle tool holder spaced from said first tool holder; and interchanging means comprising lifting means for simultaneously moving said tool holders vertically between upper and lower positions whereby said first tool holder is automatically located on the retracted slide in said lower position thereof, and turning means for turning said tool holders in the upper positions thereof about a vertical axis and through such an angle that said spare tool holder is automatically located on the slide in response to subsequent movement to said lower position thereof.

12. A structure as set forth in claim 11, wherein said positioning means comprises a male positioning element and a female positioning element, one of said elements being rigid with said slide and one other positioning element being rigid with each of said tool holders, said male element extending into said female element in the retracted position of said slide and in the lower position of the respective tool holder, sockets provided on one of said elements and pins provided on the other element and extending into said sockets when said male element is properly received in said female element.

13. A structure as set forth in claim 12, wherein each of said pins is provided with a sharp annular shoulder having a tight sliding fit in the corresponding socket to push away any such foreign matter which could interfere with proper positioning of the respective tool holder on said slide.

14. A structure as set forth in claim 12, wherein each of said pins comprises a front section whose diameter is slightly less than the internal diameter of the respective socket to effect coarse positioning of the corresponding tool holder, each of said pins further comprising a rear section having a tight sliding fit in the respective socket to effect final positioning of such tool holder.

15. A structure as set forth in claim 14, wherein the difference between the diameters of said front sections and the respective rear sections is in the range of between 0.02–0.05 mm.

16. A structure as set forth in claim 11, wherein said positioning means comprises a male positioning element and a female positioning element, one of said elements being rigid with said slide and one other element being rigid with each of said tool holders, said male element extending into the female element in the retracted position of said slide and in the lower position of the respective tool holder, and further comprising locking means for locking said slide to that tool holder which is properly located thereon, said locking means comprising a locking bolt reciprocably supported by one of said elements, a bore provided in the other element and registering with said locking bolt when the respective tool holder is properly located on said slide, and shifting means for moving said bolt into and from said bore.

17. A structure as set forth in claim 16, wherein said locking bolt comprises a sharp annular shoulder accurately fitting into said bore to push away any such foreign matter which could interfere with proper locking action.

18. A structure as set forth in claim 16, wherein said locking bolt comprises a front section whose diameter is slightly less than the diameter of said bore to effect coarse positioning of said bolt, and a rear section having a tight sliding fit in said bore to effect final positioning of the bolt.

19. A structure as set forth in claim 16, wherein said locking bolt comprises a front portion having an end face provided with a recess therein, said locking means further comprising a plug received in said bore and having a portion eccentrically extending into said recess when the bolt is shifted to locking position.

20. A structure as set forth in claim 16, wherein said shifting means comprises a plunger for moving the locking bolt in said bore, said locking bolt and said plunger having inclined contact surfaces which abut against each other during movement of the bolt to locking position.

21. A structure as set forth in claim 16, wherein one locking bolt is mounted on each of said tool holders and comprises a downwardly extending claw, said shifting means comprising a plunger having an upwardly extending claw which engages the claw of the respective locking bolt when the corresponding tool holder is properly positioned on said slide so that the plunger is automatically coupled to such locking bolt.

22. In an automatic multiple spindle machine, a frame provided with horizontal guide means; a tool slide mounted on said guide means and movable to and from a retracted position; drive means provided on said slide; a first multiple-spindle tool holder positioned on said slide for movement therewith, said tool holder being movable up and down with reference to said slide; locking means for detachably securing said tool holder to said slide; coupling means provided on said tool holder and on said slide for connecting said drive with the spindles of the tool holder on locking of the tool holder to the slide, said coupling means comprising a first clutch element mounted on said slide, a second clutch element mounted on said tool holder, and actuating means for moving one of said clutch elements into motion transmitting engagement with the other clutch element on locking of the tool holder to said slide; a spare multiple-spindle tool holder angularly spaced from said first tool holder with reference to a vertical axis; and interchanging means for replacing said first tool holder with said spare tool holder on disengagement of said locking means and in retracted position of said slide, said interchanging means comprising lifting means for simultaneously moving said tool holders vertically between lower positions and upper positions in which said tool holders are located at a level above said slide, and turning means for turning said tool holders about said axis through such an angle that said spare tool holder is automatically positioned for locking to said slide on subsequent movement to its lower position.

23. A structure as set forth in claim 22, further comprising positioning means for locating one of said tool holders on said slide prior to locking thereof, one of said clutch elements extending through a portion of said positioning means.

24. A structure as set forth in claim 22, wherein said actuating means comprises resilient means for moving said one clutch element in one direction and electromagnet means for moving said one clutch elements in the opposite direction whereby said one clutch element engages with the other clutch element in one of said positions thereof.

25. In a machine tool, a frame provided with elongated horizontal guide means; a slide mounted on said guide means for movement to and from a retracted position; a first tool holder detachably connected with said slide; a spare tool holder, each of said tool holders having a center of gravity and a yoke located above such center of gravity; and interchanging means comprising lifting means for simultaneously moving said tool holders vertically between upper and lower positions in retracted position of said slide, and turning means for simultaneously turning said tool holders in the upper positions thereof and through such an angle that the spare tool holder is automatically connected with retracted slide on subsequent movement to said lower position thereof, said lifting means comprising a pair of vertically movable arms having outwardly extending projections each of which is received in one of said yokes so that the yokes automatically rise and descend in response to reciprocation of said lifting arms.

26. A structure as set forth in claim 25, wherein said projections extend with clearance into the corresponding yokes in the lower positions of said tool holders and wherein said lifting means further comprises cooperating male and female locating members provided on said yokes and on said projections, said male locating members being arranged to automatically enter the respective female locating members on upward movement of said lifting arms.

27. In a machine tool, a frame; elongated substantially horizontal guide means provided on said frame; a slide reciprocable along said guide means to and from a retracted position; a first tool holder detachably connected with said slide; a spare tool holder; interchanging means for replacing said first holder with said spare holder, comprising lifting means for moving said holders vertically between upper and lower positions in retracted position of said slide, and means for turning the holders in said upper positions thereof through such an angle that the spare holder is automatically connected with said slide on subsequent movement to its lower position; and programming means for regulating the movements of said slide and the operation of said interchanging means.

28. A structure as set forth in claim 27, wherein said programming means comprises a programming device mounted on said slide, a switch box mounted on said frame, and cooperating control elements mounted on said programming device and in said switch box.

29. A structure as set forth in claim 28, wherein said programming device comprises at least one guide rail for each of said tool holders.

30. In a machine tool, a frame; a supporting structure mounted on said frame; a first tool holder detachably connected with said supporting structure; at least one spare tool holder; and interchanging means for replacing said first tool holder with said spare tool holder, comprising first displacing means operative to move said tool holders simultaneously along a straight path in directions toward and away from said supporting structure, and second displacing means for simultaneously turning said tool holders in their positions away from said supporting structure and through such an angle that the spare tool holder is automatically connected with the supporting structure on subsequent movement toward such supporting structure.

31. In a machine tool, a frame; a slide mounted on said frame; a first tool holder detachably connected with said slide; a spare tool holder; and interchanging means comprising lifting means for simultantously moving said tool holders vertically toward and away from said slide, and turning means for simultaneously turning said tool holders subsequent to movement away from said slide and through such an angle that the spare tool holder is automatically connected to the slide subsequent to downward movement thereof.

32. In an automatic multiple spindle machine, a frame; a slide mounted on said frame; a first multiple-spindle tool holder detachably connected with said slide; a spare multiple-spindle tool holder; and interchanging means comprising lifting means for simultaneously moving said tool holders vertically toward and away from said slide, and turning means for simultaneously turning said tool holders subsequent to movement away from said slide and through such an angle that the spare tool holder is automatically connected to the slide subsequent to downward movement thereof.

References Cited by the Examiner

UNITED STATES PATENTS

| 1,902,179 | 3/1933 | Oberhoffken | 29—26 |
| 2,925,016 | 2/1960 | Walter et al. | 90—11 |
| 3,038,385 | 6/1962 | Smith | 90—11 |

FOREIGN PATENTS

| 1,101,910 | 3/1961 | Germany. |
| 946,154 | 1/1964 | Great Britain. |

WILLIAM W. DYER, JR., *Primary Examiner.*